Jan. 27, 1970  G. MATTHEWS ET AL  3,492,384
METHOD OF MOULDING MATERIALS
Filed July 7, 1965  3 Sheets-Sheet 1

United States Patent Office 3,492,384
Patented Jan. 27, 1970

3,492,384
METHOD OF MOULDING MATERIALS
Geoffrey Matthews and David E. Matthews, Effingham, and Stanley Norman Ford, Bookham, England, assignors to 4D Research and Development Co. Ltd., Esher, Surrey, England, a limited company of the United Kingdom
Filed July 7, 1965, Ser. No. 470,110
Claims priority, application Great Britain, Nov. 27, 1964, 48,350/64
Int. Cl. B28b 1/26, 7/36; B29c 1/04, 27/00
U.S. Cl. 264—71                                    7 Claims

ABSTRACT OF THE DISCLOSURE

A method of casting or moulding is provided wherein a membrane which is resilient and flexible at atmospheric temperatures is arranged over a mould form. The membrane is drawn into and in contact with the mould form by applying negative pressure to the mould side of the membrane and the membrane is allowed to take the shape of and follow the contours of the mould form. The mouldable material is placed on the membrane in the mould form and allowed to set, during which time the negative pressure on the membrane is maintained. After the mouldable material has set, the negative pressure on the membrane is discontinued and a positive pressure is applied to the mould side of the membrane to thereby release the casting and membrane from the mould form. The membrane can be easily removed by stripping by hand.

---

This invention relates to the production of castings from mouldable materials such as concrete, plaster or synthetic plastics materials.

It is an object of the invention to obtain castings with an improved surface finish and with a quick and effective release from a mould.

According to the invention there is provided a method of casting comprising the steps of arranging over a mould form a membrane which is extendible and flexible at atmospheric temperatures; drawing the membrane into the mould form by negative pressure whereby the membrane will follow the contours of the mould form; placing mouldable material on the membrane in the mould form and allowing the material to set, the negative pressure on the membrane being maintained during the setting period; discontinuing the application of negative pressure to the membrane; and introducing a positive pressure between the surface of the mould form and the membrane thereby to release the casting.

The term "negative pressure" as used herein means a sub-atmospheric pressure and the term "positive pressure" means atmospheric pressure or a pressure greater than atmospheric pressure.

In carrying out the method of the invention, there can be used a mould comprising a base with side formers, the outer surfaces of the base and formers being impervious to air and moisture and the inner surfaces being mould surfaces a flat extendable and flexible membrane arranged over the mould surfaces of the base and formers; and means for introducing in turn a negative and a positive pressure between the membrane and the base whereby the membrane is in turn drawn into close contact with the said inner mould surfaces and released from such contact.

The side formers of the mould can be hinged to the based to facilitate release of vertical sided castings. When posititve pressure is applied the casting rises in the mould and the side formers automatically hinge outwards thereby to avoid most of the suction and/or friction normally occasioned during the release of a casting from a mould.

Figure 1:
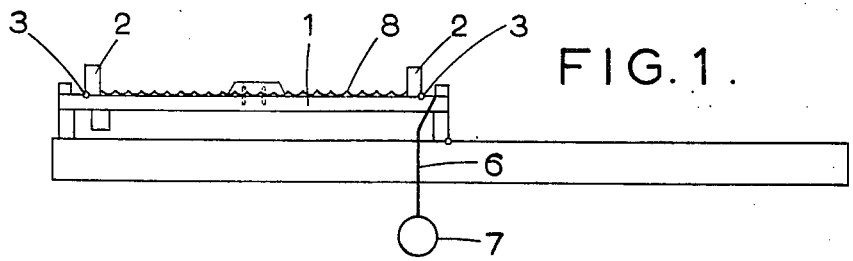
Figure 2:
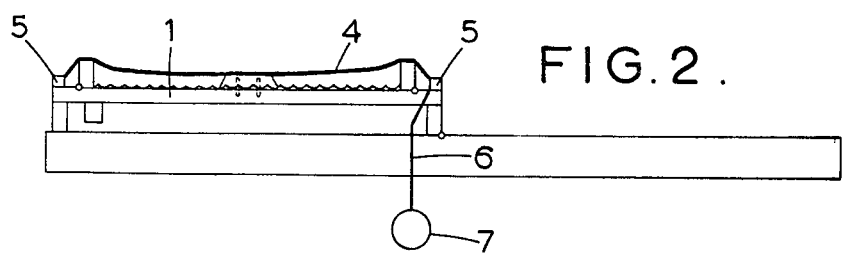
Figure 3:
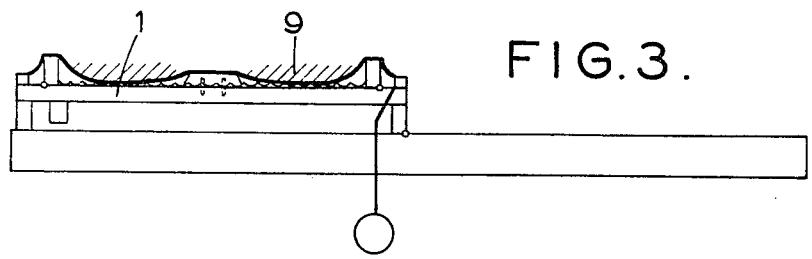
Figure 4:
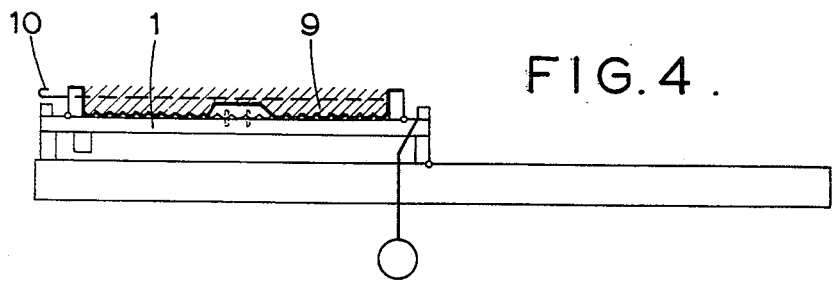
Figure 5:
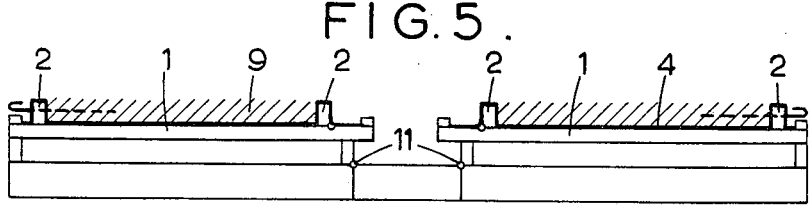
Figure 6:
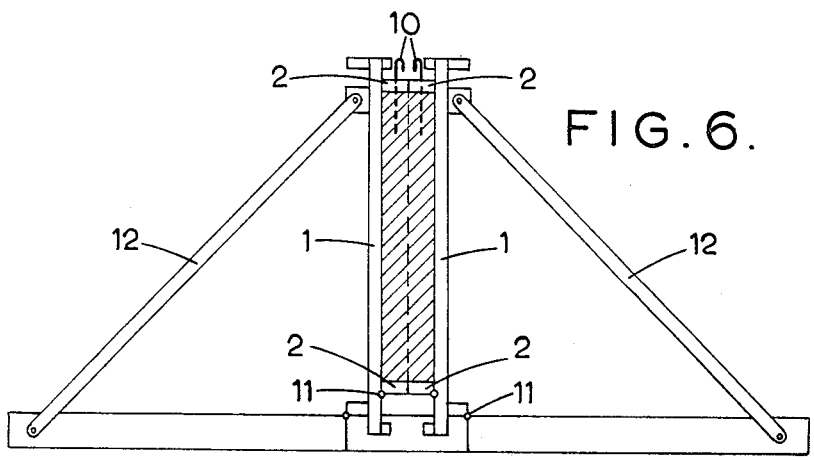
Figure 7:
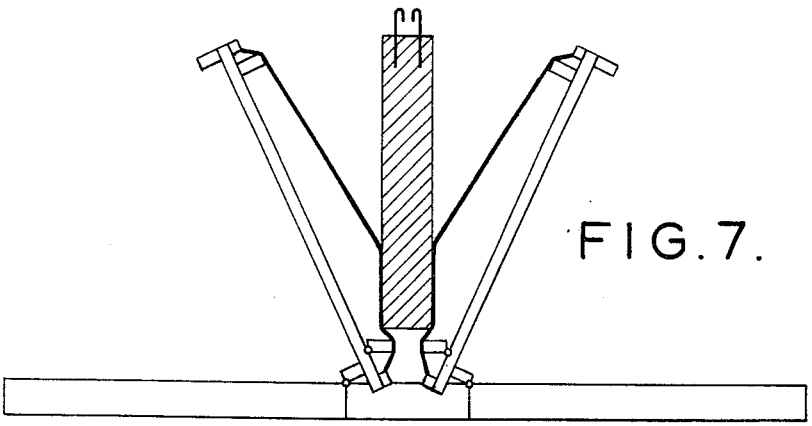
Figure 8:
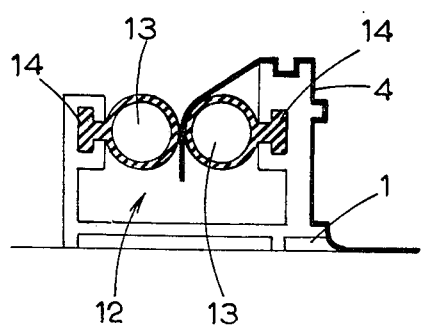
Figure 9:
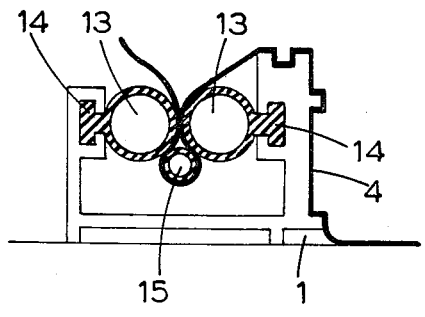
Figure 10:
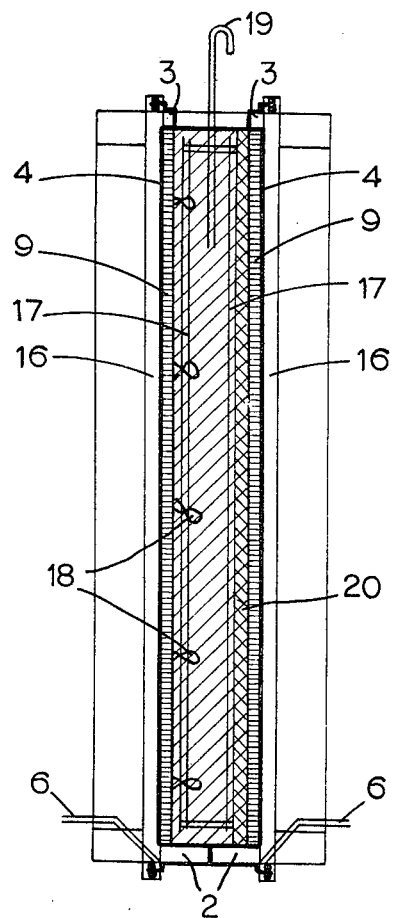

In the accompanying drawings,
FIGURES 1 to 4 are sectional diagrams illustrating various stages in the casting of a concrete panel in accordance with this invention,
FIGURES 5, 6 and 7 illustrate an alternative method of casting,
FIGURES 8 and 9 illustrate anchorages forming part of moulds constructed in accordance with the invention and
FIGURE 10 illustrates another method of casting.

In the embodiment of the invention illustrated in FIGURES 1-4, a concrete panel with a glass-like surface finish is produced in a mould comprising a flat polished base 1 and side formers 2 defining the peripheral edge of the mould and hinged to the base at 3. The depth of the formers 2 depends on the thickness of the panel it is required to produce. The inner (i.e.) mould surfaces of the base and formers are permeable to air and water. If the base and formers are of timber sufficient permeability will be produced by the natural characteristics of the timber. The outer surfaces of the base and formers are rendered impervious to air in any suitable manner, for example by coating with rubberised varnish. A thin flexible membrane 4 is arranged over the base and side formers and is then anchored and sealed to the base at 5 in a manner to be described. If desired, the surface of the membrane 4 adjacent the mould surfaces can be permeable to air and water, in which case it is not necessary for the mould surfaces to be permeable. The effect of permeability can be obtained by roughening the surface of the membrane. The air between the membrane 4 and the mould surfaces, i.e. the inner surfaces of the base and formers, is evacuated by the application of negative pressure through a pipe line 6 extending through an aperture in the base and connected to a suction pump 7. This causes the membrane to be brought tightly into contact with the mould surfaces. If it is desired to cast an article with a patterned surface, a template 8 can be arranged between the base 1 and the membrane 4 which will then follow the pattern of the template when the negative pressure is applied. Liquid concrete 9 is then placed in the mould and the negative pressure is maintained until the concrete has set. The negative pressure is then discontinued and positive pressure sufficient to raise the finished panel is applied through the same pipe line 6 thereby raising it above the formers which hinge outwards. The panel can then be lifted off the membrane and the negative pressure re-applied to the mould which is once more ready for operation without cleaning.

Positive pressure can be applied to a finished panel either by opening the line 6 to atmosphere or by the use of a pressure pump acting through the same line.

If desired re-inforcing members 10 can be cast in the panel.

Where complex contoured surfaces are to be moulded with the aid of the template 8, and sharp arrises to castings are required, it is found advantageous to position sufficient of the concrete mix at a stage when the membrane 4 is only partially drawn to the mould faces. In all cases when the mix is in the mould, the mould should be vibrated so that the possibility of air being locked in any crevices of the mould face will be eliminated and a completely dense surface free of pockets of air will result as the air is withdrawn below the membrane and the membrane drawn into every crevice of the mould until complete contact of the membrane and mould are achieved.

The membrane or shutter liner 4 may be of material known as "Revultex," manufactured by Revertex Ltd. of London. Revultex is a natural rubber latex compounded with water-insoluble vulcanizing ingredients, which yield a vulcanized natural rubber when water is removed therefrom by drying. The vulcanized rubber is substantially insoluble in and chemically inert to water. It is desirable that the membrane has characteristics which give is resistance to tear and extendability in the region of 1,000% upwards and which is capable of being drawn to the mould under negative pressure in the range of 2 to 28 (preferably between 10 and 15) inches of mercury.

Depending on the material being cast and the type of finish desired, it may be necessary for the membranes to have other characteristics. For use in the casting of concrete products, membranes which range from being completely impervious to water and air may be used to those which absorb air and water such absorption being assisted by the negative pressure beneath the membrane, such air and water being carried away through the pumps. Membranes which have a high degree of permeability to air and water may be constructed from high density foamed latex with interconnecting cells.

Non-absorbent membranes will produce concrete finishes which will be of high quality, but which will not have characteristics which improve its resistance to deterioration in exposed external positions. Membranes which absorb water or water and air will produce a surface finish of high density and quality free of air-pockets voids due to water-pockets on the surface of the concrete or plaster and low density areas. These will be highly resistant to deterioration in exposed external positions.

Concrete finishes which are conventionally achieved by sand blasting and acid etching techniques after striking from the moulds, or by the use of retarders applied to the mould prior to casting, can be obtained in this invention by introducing retarder additives into the structure of the membrane. Effective additives found to be suitable for such purposes in membranes constructed from "Revultex" compounds is sugar solution.

The effect of these additives will retard the surface to a degree dependent on the amount introduced into the membrane. The advantages of using this method are that retardation can be achieved both on complex profiles and on plane surfaces in an even manner and on removing the membrane, the surface is removed with the membrane and the moulded product requires only simple dry brushing to remove any surplus unhydrated material.

The invention is not restricted to the casting of concrete, when the mouldable material is plaster or glass-fibre reinforced resins and synthetic plastic materials, non-absorbent membranes should be used.

In the case of concrete and fibre-glass reinforced resins it is of advantage to leave the membrane on the cast product for periods of time up to installation.

In concrete production, the membrane will act as a means of controlling the rate of evaporation which should be kept high during its cure period of twenty-eight days. By this method, moulded products can be stored in open yards without having to be wetted down or covered to retain the water content in sunny weather. It also acts as a protection in handling. The removal of the membrane, which will be firmly attached, can be effected simply by stripping by hand from the edges; the membrane comes away in one piece.

In the embodiment illustrated in FIGURES 5, 6 and 7 a panel can be produced by placing the mouldable material (which must be a cement mix having a water content of not more than 50%, by weight of the cement) in two identical moulds similar to that of FIGURES 1 to 4. The two moulds are then brought on hinges 11 into the vertical position and in face to face contact as shown in FIGURE 6. The action of the negative pressure will hold the mix against slumping while the moulds are brought into the vertical position. The moulds are then held together by supports 12 and vibrated to bond the two mixes. The negative pressure is maintained until the concrete has set, and then discontinued and positive pressure applied. The moulds are unlocked and moved away from the cast panel.

FIGURES 8 and 9 illustrate suitable anchorage devices for the membrane 4. In the FIGURE 8 arrangement, a a channel 12 surrounds the side formers 2 and contains two inflated rubber tubes 13 secured by nipples 14 in the channel. The perimeter of the membrane is passed between these tubes and is held by the pressure between the tubes. The membranes can be released by deflating one or both of the tubes. FIGURE 9 shows a modified construction intended for use where the membrane is to be used for more than one operation in which the membrane is anchored to a third rubber tube 15 arranged below the tubes 13.

If the panel has been cast in situ, the moulds are then removed to the next casting position, but if the operation is on production line the panel is removed and the moulds re-positioned.

In another embodiment illustrated in FIGURE 10, a panel with a glass like surface on both sides can be produced by placing mouldable material in two identical moulds 16 similar to those previously described. The two moulds are arranged in a manner as shown previously, each of the moulds comprising a base 16, containing two side or edge formers 2, 3 defining the peripheral edge of the mould. Mouldable material is placed in the two moulds. The material is allowed to set sufficiently to allow the moulds to be brought together and locked in any suitable way with a reinforcing member 17 between them and negative pressure is applied to the membranes 4 of both moulds simultaneously. If desired, insulating material 20 can be placed adjacent facing layers 9. Liquid mouldable material is then placed between the two moulds and the whole is vibrated. As shown in FIGURE 10, the bottom side formers 2 are made to extend beyond the facing layers 9, whereas the top side formers 3 are reduced in height to the depth of the facing layers 9 to allow flowable mouldable material to be placed between the facing layers 9 and retained at the bottom end by side formers 2 which prevent the flowable material from running out between the moulds. Reinforcing members 17 can be positioned between the moulds and supported by the insulating material 20 and/or supports or anchors 18. The mouldable material can be provided with lifting hooks 19. The negative pressure is maintained until the mouldable material has set. The negative pressures are then discontinued. The moulds are unlocked and positive pressure applied thereby moving the moulds clear of the panel which remains stationary.

The mouldable material can be reinforced or cored with insulating material such as polystyrene, wood wool, foamed concrete. The mouldable material can be placed in the mould by pouring, spraying or injection. The use of spraying is particularly useful with synthetic plastics material in the form of paints or solutions in water.

The membrane can be of latex, rubber compound, synthetic rubber, or plastics material with similar characteristics. The membrane must be flexible and extendible at atmospheric temperatures.

It will be appreciated that the invention enables concrete and plaster panels or concrete panels surfaced with plaster already re-inforced and insulated to be readily produced in simple moulds that require no cleaning between operations.

The invention also has the advantage of producing a surface finish whether smooth, textured or patterned vastly superior to that produced by conventional methods.

Further advantages are the ease of removal of the panel from the mould enables the panel to be handled much quicker than with other production methods permitting greater output per mould.

By the use of the invention, large concrete panels can be produced suitable for use in construction of pre-fabricated houses and commercial buildings, both for exterior and partition walls. The exterior panels can be suitably reinforced and insulated during casting and the exterior finish either smooth, patterned or textured concrete, whilst the interior surface can be of plaster requiring no further treatment. For partitioning, the panels can be cast with plaster surfaces on both sides.

EXAMPLE

In one practical example, a concrete panel 6 feet by 3 feet by 4 inches thickness was produced from a mould constructed of plywood and timber members. The mould base is of ¾" plywood suitable framing and is provided with hinged side formers 4 inches high.

A water absorbent membrane of 0.005" thickness was placed over the mould.

The concrete mix consisted of one part cement, two parts of sand and four parts of an aggregate (all parts being by weight) with a water content equal to 50% of the weight of cement.

Slow evacuation of the air between the mould and the membrane was made at the same time as 50% of the concrete mix was placed in the mould and while vibrating the mould. When the air was removed, the mould was subjected to a degree of negative pressure necessary finally to draw the membrane to the mould surfaces. Reinforcing mesh and hooked lifting rods were located through slots in the side formers of the mould. When the membrane was in its final position, and a degree of vacuum stabilised at 15" of mercury, the remaining mix was introduced and vibration resumed for a short period to complete compaction of the mix.

The vacuum was maintained at 15" mercury for a period of 3 hours during which time water was being withdrawn from the face of the casting and taken away in vapour through the suction equipment. Initially, in this stage of casting, water at face is replaced by small particles in the mix which compact on to the membrane to produce a dense hard surface finish and at the same time create a high suction between the membrane and concrete face.

Initial set was obtained in 4 hours and the whole mould lifted into a vertical position being maintained in such a position by stays. Lifting tackle was attached to the hooked rods and the tackle positioned to take the load on release from the mould. The negative pressure was then cut off and applied to the inner edge seal anchorage rubber tube so releasing the restraint applied to the perimeter of the membrane.

The casting together with the membrane attached to it was then moved sideways away from the mould form which was attained without any stress being imposed on the casting or mould, leaving the mould completely free for re-charging as previously described. The casting was then stacked and the membrane taken off when the cure was complete.

What is claimed is:

1. A method of casting or moulding, which consists essentially of arranging over a mould form a thin elastomeric membrane which is extendible and flexible at atmospheric temperatures and substantially insoluble in water; drawing the membrane into contact with the mould form by applying negative pressure to the mould side of the membrane; allowing the membrane to take the shape of and follow the contours of the mould form; placing on the membrane in the mould form mouldable material which conforms to the shape of the mould; allowing the material to set, the negative pressure on the membrane being maintained during the setting period; discontinuing the application of negative pressure to the membrane; and then applying positive pressure to the mould side of the membrane, thereby to release the casting from the mould.

2. A method of casting or moulding in accordance with claim 1 which comprises providing two mould forms; arranging over each mould form a membrane which is extendible and flexible at atmospheric temperatures and substantially insoluble in water; drawing each membrane into and in contact with its associated mould form by applying negative pressure to the mould side of each membrane whereby each of said membranes takes the shape of and follows the contours of its mould form; placing mouldable material in each mould form on the membrane therein and allowing it to at least partially set to a shape-retaining condition; positioning the two moulds so that the mouldable materials in each mould are in face-to-face relationship but not in contact with one another; introducing additional mouldable material in flowable form between the mouldable material already at least partially set in the two moulds; vibrating the moulds; allowing the added mouldable material to set, while maintaining the application of negative pressure on the mouldable material in the moulds; discontinuing the application of negative pressure; and releasing the moulded product from the mould forms.

3. A method of casting or moulding as claimed in claim 1 wherein the membrane is at least partially pervious to water and air.

4. A method of casting or moulding in accordance with claim 3 which comprises providing two mould forms; arranging over each mould form a membrane which is extendible and flexible at atmospheric temperatures; drawing each membrane into and in contact with its associated mould form by applying negative pressure to the mould side of each membrane whereby each of said membranes takes the shape of and follows the contours of its mould form; placing mouldable material in each mould form on the membrane therein; bringing the two moulds together so that the material in the two moulds is brought into contact before it is set, said negative pressure being maintained during such operation; vibrating said moulds to bond the contacting surfaces of said material together; allowing said material to set while still maintaining said negative pressure; discontinuing the application of said negative pressure; and releasing the moulded product from said mould form.

5. A method of casting or moulding as claimed in claim 1 which includes spacing the membrane from the mould form by a template before the application of negative pressure to the mould side of the membrane.

6. A method of casting or moulding as claimed in claim 1, including the steps of allowing suspending liquid for the mouldable material to diffuse through the membrane, and volatilizing the liquid on the other side of the membrane.

7. A method of casting or moulding in accordance with claim 1, wherein the membrane is drawn into tight contact with the mould and thereby takes the shape of and follows the contours of every detail of the mould form.

References Cited

UNITED STATES PATENTS

| | | | |
|---|---|---|---|
| 937,620 | 10/1909 | Loser. | |
| 2,629,135 | 2/1953 | Johnson | 264—23 |
| 2,655,710 | 10/1953 | Roensch et al. | 264—87 |
| 3,231,647 | 1/1966 | Oesterheld | 264—316 X |
| 3,237,357 | 3/1966 | Hutchings | 52—410 X |
| 3,269,886 | 8/1966 | Dellenbaugh | 264—316 |
| 3,295,278 | 1/1967 | Muhm | 52—410 X |
| 932,692 | 8/1909 | Fiddyment | 52—410 |

FOREIGN PATENTS 162,257  12/1953  Australia.

ROBERT F. WHITE, Primary Examiner

J. H. SILBAUGH, Assistant Examiner

U.S. Cl. X.R.

25—41; 249—113; 264—87, 250, 261, 316, 335